(12) United States Patent
Silas

(10) Patent No.: US 6,385,999 B1
(45) Date of Patent: May 14, 2002

(54) GLASS BENDING PROCESS

(75) Inventor: Richard Lionel Silas, 1139 - 11th Street S.E., Calgary, Alberta (CA), T2G 3G1

(73) Assignee: Richard Lionel Silas, Calgary (CA)

(*) Notice: Subject to any disclaimer, the term of this patent is extended or adjusted under 35 U.S.C. 154(b) by 0 days.

(21) Appl. No.: 09/515,056

(22) Filed: Feb. 28, 2000

(51) Int. Cl.[7] .......................... C03B 21/00; B32B 17/00
(52) U.S. Cl. .............................. 65/106; 65/111; 65/281; 156/101; 156/102
(58) Field of Search .................... 65/102, 106, 107, 65/23, 76, 275, 281, 287, 111; 156/99, 101, 102, 196, 230

(56) References Cited

U.S. PATENT DOCUMENTS

| | | | | |
|---|---|---|---|---|
| 2,542,134 A | * | 2/1951 | Gregory | 65/111 |
| 3,115,403 A | | 12/1963 | Julio | 65/290 |
| 5,713,976 A | | 2/1998 | Kuster et al. | 65/106 |
| 5,776,220 A | * | 7/1998 | Allaire et al. | 65/111 |
| 5,882,370 A | | 3/1999 | Garner et al. | 65/106 |
| 6,009,726 A | | 1/2000 | Funk | 65/106 |

* cited by examiner

*Primary Examiner*—Donald J. Loney
(74) *Attorney, Agent, or Firm*—Paul Sharpe Marks & Clerk

(57) ABSTRACT

A process for bending tempered glass. The process involves adhering two sheets of tempered glass in overlying relation and positioning a containment barrier such as vinyl sheets over the adhered unit. The glass is fractured and the unit manipulated into a desired shape. Once the adhesion has set, the vinyl is removed.

10 Claims, 3 Drawing Sheets

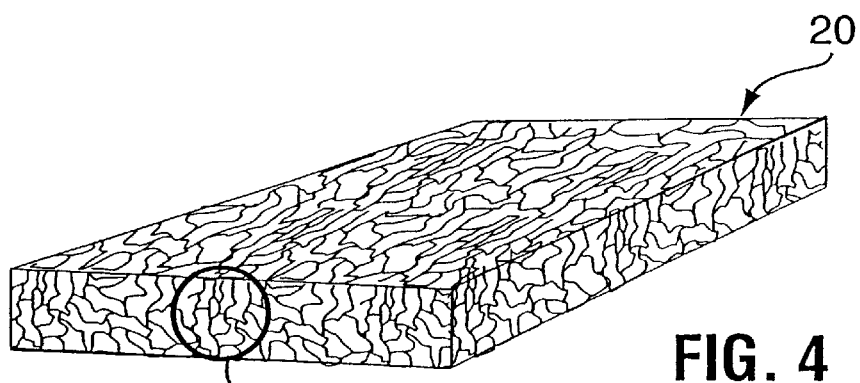
FIG. 4
FIG. 4A
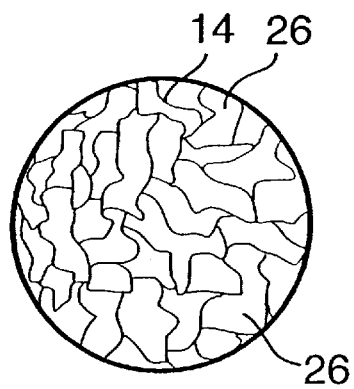
FIG. 4A
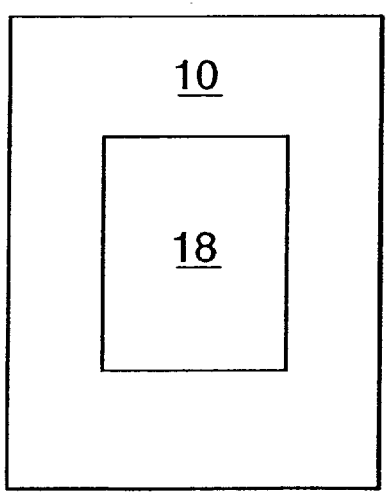
FIG. 5
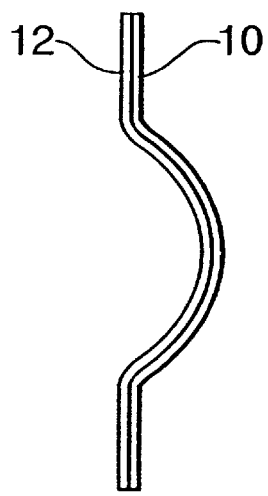
FIG. 5A

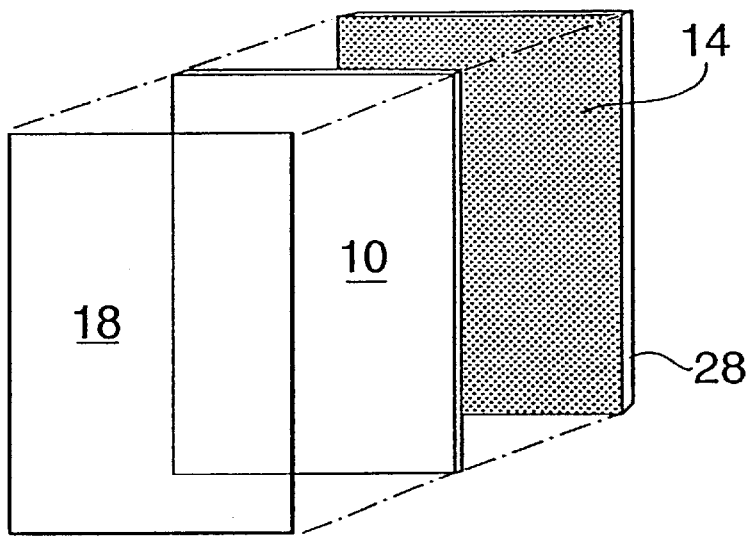
FIG. 6
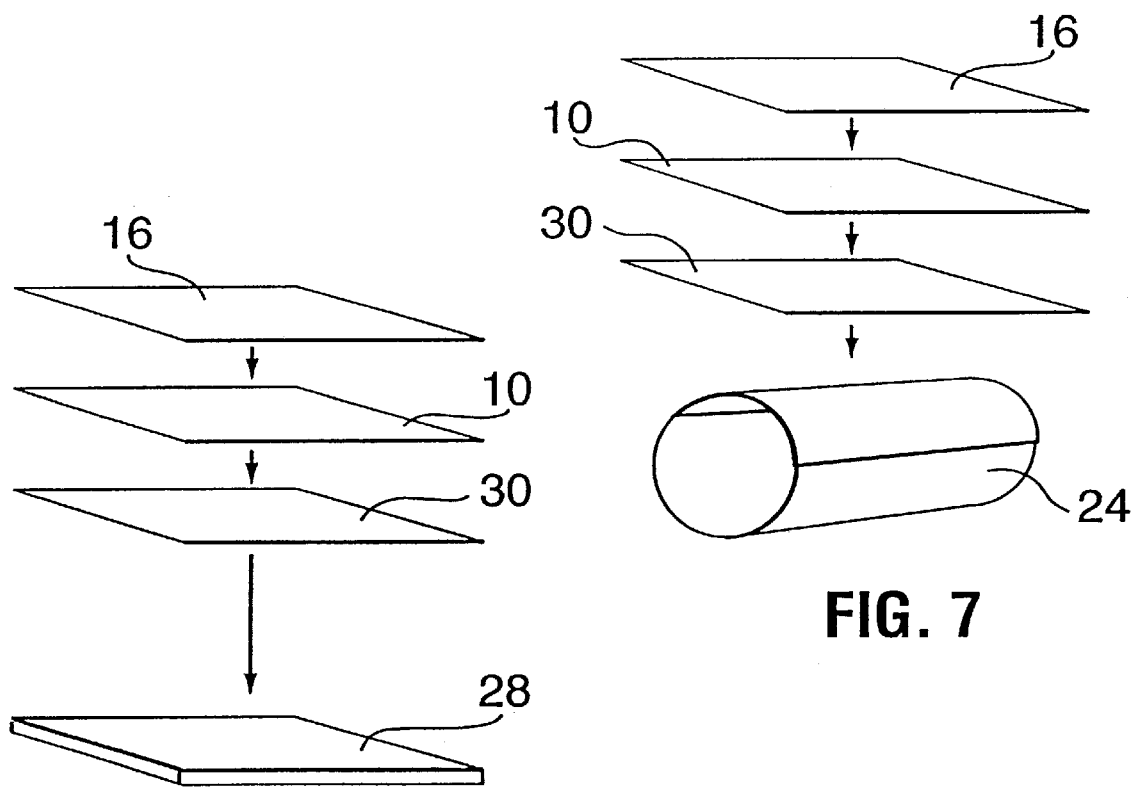
FIG. 7
FIG. 8

GLASS BENDING PROCESS

FIELD OF THE INVENTION

The present invention relates to a process for bending glass and more particularly, the present invention relates to a process for bending glass in the absence of applied heat or ancillary apparatus for effecting the bending.

BACKGROUND OF THE INVENTION

Glass bending techniques have been previously proposed in the art. Generally speaking, the known techniques involve sizeable devices having press rollers and arrangements for applying heat. The heat is required to render the glass more malleable and thus bendable without fracture. Force is applied by rollers or other devices and sustained during cooling of the glass in order to "set" the desired shape. Although useful, this technique typically involves a large area to accommodate the apparatus, skilled workers to operate the apparatus and has inherent limitations regarding the extent the glass can be bent prior to breakage.

Representative of the art is U.S. Pat. No. 5,713,976, issued to Kuster et al., Feb. 3, 1998. The reference teaches a process for bending glass sheets where the sheets are in pairs and are subjected to a preliminary stress on a concave bending device. The profile of the device corresponds to the desired final profile of the glass sheets. The bending is also assisted by suction. The apparatus used to effect this bending is fairly complicated and involves multiple stages in order to effect the desired result.

Funk in U.S. Pat. No. 6,009,726, issued Jan. 4, 2000, teaches a further variation of glass bending methodology and an apparatus to effect the process. In this process, the glass being bent comprises an outer glass pane and an inner glass pane of laminated safety glass. The method is effected by a press bending device having a bending phase, a discharge phase and a means for conveying the glass from operational base to the other. The bending is effected by a combination of stress and heat where the unit to be bent is heated to a bending temperature. Once again, this method involves an apparatus that is fairly substantial and further, requires the use of heat in order to effect the bending.

In U.S. Pat. No. 5,882,370, issued to Garner et al., Mar. 16, 1999, employs a molding apparatus which effectively applies weight to the unit to be bent and further incorporates the application of heat to raise the temperature of the unit sufficiently to effect bending. A cooling phase is also required to "set" the bend in the glass.

From a review of the art, it is evident that there is no provision for any process where heat is not required to effect the bending or any significant apparatus for the application of a preformed weight, etc.

It would be desirable if there were a method for bending glass or otherwise reconfiguring the glass from its initial planar state to a finer state by bending, twisting or otherwise manipulating, which method did not require the use of expensive apparatus, preformed molds or the application of heat. The present invention addresses all of these needs.

SUMMARY OF THE INVENTION

A generic object of the present invention is to provide a process for bending glass which is not encumbered by the use of high temperatures or expensive apparatus to effect bends in glass.

A further object of one embodiment of the present invention is to provide a process for bending glass, comprising:

providing a first sheet of tempered glass and a second sheet of tempered glass;

providing an adhesive capable of bonding with the tempered glass;

applying the adhesive to at least one sheet;

positioning the first sheet of tempered glass in overlying relation with the second sheet of tempered glass forming a joined unit with adhesive there between;

providing flexible holding means for holding the joined unit during fracture of the glass;

fracturing the glass; and bending the joined unit within the holding means into a desired shape.

The process in accordance with the present invention is distinguished from, for example, safety glass preparation in that there is a requirement in the latter for a layer of support in the form of a plastic, inter alia, sheet. The present invention employs a settable adhesive between the sheets. Once the sheets are fractured locally or entirely, the adhesive penetrates interstitially of the individual fractured segments and between the sheets to result in innumerable bonds thus providing a consolidated unit. The provision of a holder or temporary containment member in the form of, for example, a flexible sheet imparts integrity to the formed structure while the adhesive sets. This is easily removed once the adhesive has set.

A further object of the present invention is to provide a process for bending glass, comprising:

providing a first sheet of tempered glass and a second sheet of tempered glass;

providing an adhesive capable of bonding with the tempered glass;

applying the adhesive to at least one sheet;

positioning the first sheet of tempered glass in overlying relation with the second sheet of tempered glass forming a joined unit with adhesive there between;

providing flexible material for temporary overlying contact with each sheet of the unit during fracture of the glass;

fracturing the glass;

bending the joined unit into a desired shape; and removing the flexible material upon setting of the adhesive.

Evidently, the process can produce a host of articles including as examples furniture, works of art, building materials, signage, among a host of others.

Another object of one embodiment of the present invention is to provide a contoured glass article, comprising:

a first contoured layer of shattered tempered glass;

a second contoured layer of shattered tempered glass in overlying relation with the first contoured layer and in a mating contour with a contour of the first contoured layer; and cured adhesive between each the layer to provide fixture of each layer to the other and between individual shattered glass segments of each of the first contoured layer and the second contoured layer to form a consolidated contoured article.

Having thus described the invention, reference will now be made to the accompanying drawings illustrating preferred embodiments.

BRIEF DESCRIPTION OF THE DRAWINGS

FIG. 4 is a perspective view of a completed article made by the process;

FIG. 4A is an enlarged localized view of FIG. 4;

FIG. 5 is a plan view of an alternate product made in accordance with the process of the present invention;

FIG. 5A is a side view of FIG. 5; and

FIG. 6 is an exploded view of an alternate embodiment.

Similar numerals in the figures denote similar elements.

DETAILED DESCRIPTION OF THE PREFERRED EMBODIMENTS

Figure 1:
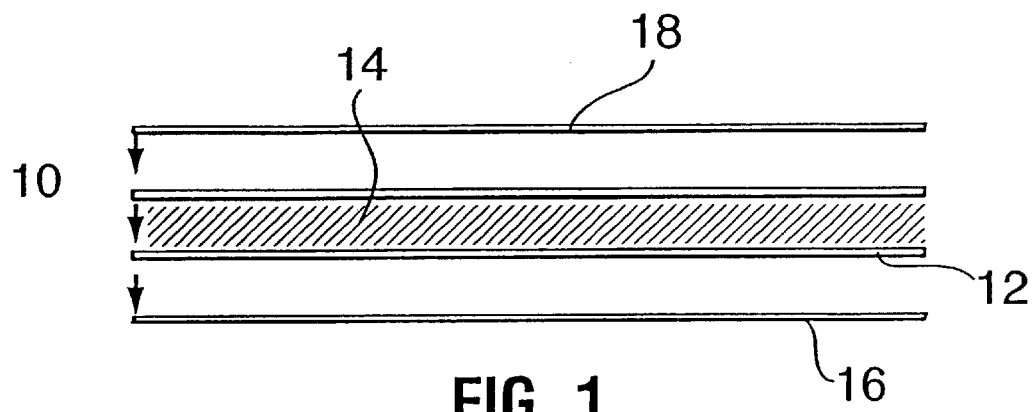
FIG. 1 is an explode view of one embodiment of an article made in accordance with the process.

Referring now to the drawings, FIG. 1 illustrates an exploded view of one embodiment of the present invention. In the illustration, a first sheet of tempered glass 10 is provided in overlying relation with a second sheet of tempered glass 12. A layer of adhesive represented by numeral 14 is disposed between sheets 10 and 12. A containment member or holder, shown in the example as flexible sheets 16 and 18 overlie the outside major faces of each sheet 10 and 12. An adhesive (not shown) may be applied to each sheet 10 and 12 or alternatively, the flexible sheets may inherently include adhesive thereon.

Figure 2:
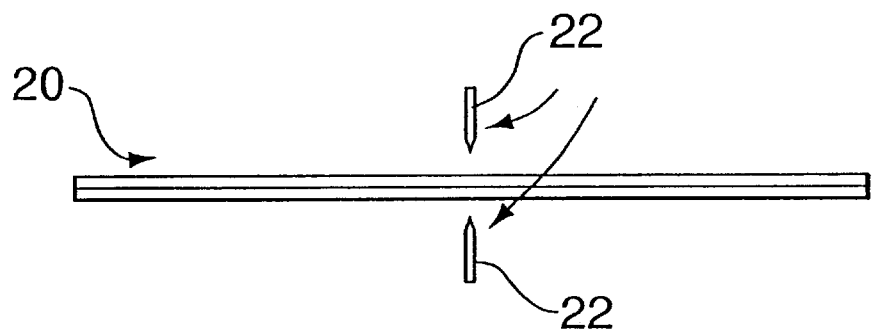
FIG. 2 is a side view of a consolidated unit depicted in FIG. 1.

The consolidated unit, globally referenced by numeral 20, is shown in FIG. 2. In order to shatter the sheets 10 and 12, an impact device, broadly referenced by numeral 22 is used. It has been found that a conventional punch can achieve desirable results. The shattering is performed while the adhesive is wet and the flexible sheets 16 and/or 18 may be directly struck with the punch.

Once the degree of shattering has been achieved, the consolidated unit is sufficiently malleable to permit bending, contouring or otherwise shaping. Containment is facilitated by the flexible sheets and adhesive.

Figure 3:
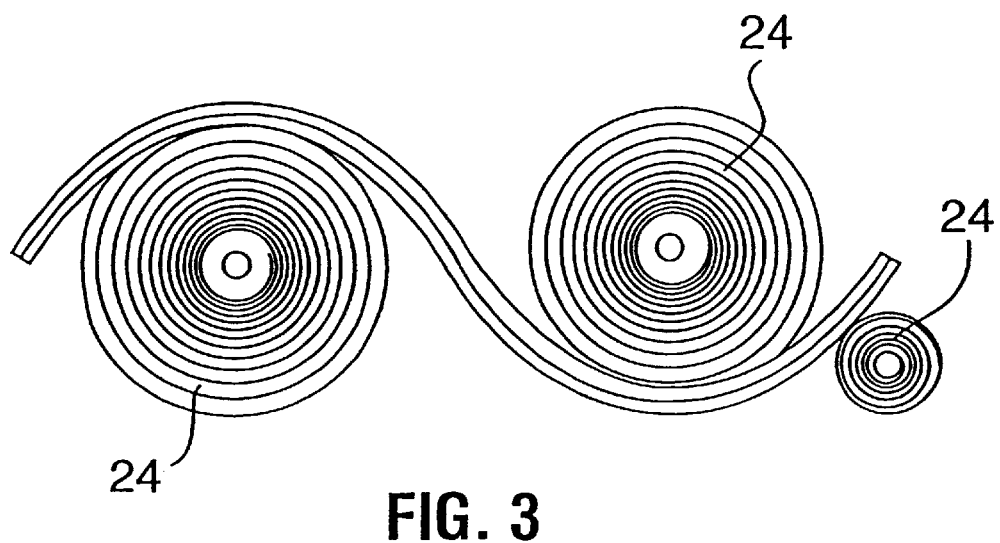
FIG. 3 is a side view of a mold for bending the glass unit prepared by the process.

FIG. 3 illustrates an example of how the unit 20 may be molded. Molds 24 may be positioned about the unit 20 and remain there until such time as the adhesive has set. Once this has occurred, the sheets 16 and 18 may be removed to leave a consolidate form taking the shape as shown in FIG. 3.

FIGS. 4 and 4A illustrate the consolidated unit 20 in greater detail and with sheets 16 and 18 removed. As illustrated, the unit 20 comprises a network of individual glass segments 26 with adhesive 14 dispersed therein to form a network of individually bonded segments 26. Depending upon the degree of shattering, the interface between the two sheets of glass 10 and 12 may disappear entirely with segments 26 from each sheet 10 and 12 being bonded together at the interface.

Where it is desired that the entire area of each sheet of glass be fractured, the flexible sheets 16 and 18 will cover the full area of each of the major faces of the glass sheets 10 and 12. However, if shattering is selected to be localized, the area to be fractured need only be covered. This embodiment is shown in FIGS. 5 and 5A.

By providing the flexible sheet material 16 and 18 (18 only shown in FIG. 5), localized deformation is possible as illustrated in FIG. 5A. A similar procedure to that discussed above may be observed to effect this result.

Referring now to FIG. 6, a further embodiment of the present invention is illustrated. In this aspect of the invention, a single sheet of tempered glass 10 is employed. The sheet 10 is mounted to a substrate 28 other than tempered glass with adhesive 14 being applied between sheet 10 and substrate 14. Flexible sheet 18 is applied in overlying relation to sheet 18. Shattering or fracture of the glass is achieved as set forth herein previously while the sheet 10 contacts substrate 28. Once the adhesive has set, the sheet 18 may be removed.

The substrate may comprise any suitable surface compatible with the adhesive and impact forces from the fracture of sheet 10. Plexiglass, non-tempered glass, wood, metal etc. are representative examples.

In order to enhance the aesthetic appearance of the article formed in accordance with the process, coloring agents such as pigments, chips, flakes may be added to, for example, the adhesive. Suitable adhesives for practicing the present process include suitable catalyst type adhesives, ultraviolet curable compounds ( Uvekol™), etc.

With respect to the containment achieved by the flexible sheets, the sheets may be individual or comprise a single sheet simply folded about the glass. As an example, the flexible sheet material may comprise vinyl film having adhesive on one side. Other materials may be used provided they are easily removed from the glass and permit fracture of the glass to occur. Examples of other useful arrangements for this purpose include materials which are sufficient to provide containment, but which are also easily removed from the glass. This may be a film material or thicker materials allowing impact for fracture.

As a further alternate embodiment, the shattered glass may be laminated to other surfaces such as ceramic tile, concrete, wood, steel, drywall, fabric and any other surface, thus creating a tough sparkling finish to any kind of material.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A process for bending glass, comprising:
   providing a first sheet of tempered glass and a second sheet of tempered glass;
   providing an adhesive capable of bonding with said tempered glass;
   applying said adhesive to at least one sheet;
   positioning said first sheet of tempered glass in overlying relation with said second sheet of tempered glass forming a joined unit with adhesive there between;
   providing flexible holding means for holding said joined unit during fracture of said glass;
   fracturing said glass; and
   bending said joined unit within said holding means into a desired shape.

2. The process as set forth in claim 1, further including the step of removing said holding means once said adhesive has set.

3. The process as set forth in claim 1, further including the step of adding color to said adhesive.

4. The process as set forth in claim 1, wherein said holding means comprises flexible sheet material.

5. The process as set forth in claim 4, wherein said flexible sheet material comprises film removably mounted to each side of said joined unit.

6. The process as set forth in claim 5, wherein said step of fracturing includes manually fracturing said glass.

7. A process for bending glass, comprising:

providing a first sheet of tempered glass and a second sheet of tempered glass;

providing an adhesive capable of bonding with said tempered glass;

applying said adhesive to at least one sheet;

positioning said first sheet of tempered glass in overlying relation with said second sheet of tempered glass forming a joined unit with adhesive there between;

providing flexible material for temporary overlying contact with each sheet of said unit during fracture of said glass;

fracturing said glass;

bending said joined unit into a desired shape; and removing said flexible material upon setting of said adhesive.

8. The process as set forth in claim 7, including the step of positioning said flexible material in overlying relation with an area of said glass to be fractured.

9. The process as set forth in claim 7, including temporarily fixing said flexible material to said glass.

10. The process as set forth in claim 7, including the step of adding coloring material to said adhesive.

\* \* \* \* \*